(12) United States Patent
Niemoeller et al.

(10) Patent No.: US 10,002,338 B2
(45) Date of Patent: Jun. 19, 2018

(54) METHOD AND SCORE MANAGEMENT NODE FOR SUPPORTING SERVICE EVALUATION

(71) Applicant: Telefonaktiebolaget L M Ericsson (publ), Stockholm (SE)

(72) Inventors: Joerg Niemoeller, Sundbyberg (SE); Lisa Sawin, Bridgewater, NJ (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 664 days.

(21) Appl. No.: 14/611,493

(22) Filed: Feb. 2, 2015

(65) Prior Publication Data

US 2016/0224923 A1    Aug. 4, 2016

(51) Int. Cl.
*H04W 28/24* (2009.01)
*H04W 72/08* (2009.01)
*H04L 12/26* (2006.01)
*G06Q 10/06* (2012.01)

(52) U.S. Cl.
CPC .............................. *G06Q 10/06395* (2013.01)

(58) Field of Classification Search
CPC .... G06Q 10/06395; H04L 43/08; H04L 43/06
USPC ..................................................... 379/29.06
See application file for complete search history.

(56) References Cited

U.S. PATENT DOCUMENTS

| 2003/0103461 A1* | 6/2003 | Jorgenson | H04L 41/142 370/241 |
| 2012/0327778 A1* | 12/2012 | Stanwood | H04W 72/1242 370/237 |
| 2013/0266126 A1* | 10/2013 | Dunne | H04M 3/2227 379/32.01 |

FOREIGN PATENT DOCUMENTS

EP    1447940 A2 *  8/2004  ............. H04L 43/50

* cited by examiner

*Primary Examiner* — Asad Nawaz
*Assistant Examiner* — Jason Harley
(74) *Attorney, Agent, or Firm* — Patent Portfolio Builders, PLLC (57) ABSTRACT

A method and score management node for supporting service evaluation by obtaining a perception score P reflecting a user's experience of a service delivered by means of a telecommunication network. The score management node receives network measurements related to service events when the service is delivered to the user. For each received network measurement, the score management node determines a quality score Q reflecting the user's perception of quality of service delivery by applying a first function on the network measurement, and determines an associated significance S reflecting the user's perception of importance of service delivery by applying a second function on the network measurement. The first and second functions are dependent on network measurement type. The perception score P is then calculated based on the determined quality scores Q and associated significances S, wherein the calculated perception score P is made available for use in the service evaluation.

25 Claims, 4 Drawing Sheets

| Measurement Type | 1st Function - Quality Score, Q | 2nd Function - Significance Score, S |
|---|---|---|
| <type 1> | Q1(v) | S1(v) |
| <type 2> | Q2(v) | S2(v) |
| <type 3> | Q3(v) | S3(v) |
| ... | ... | ... |

Fig. 3

| Measurement Type | 1st Function - Quality Score, Q | 2nd Function - Significance Score, S |
|---|---|---|
| v = Video frame-rate | v < 10fps : Q=0 | : S=30 |
| | 10fps <= v < 15fps : Q=1 | : S=20 |
| | 15fps <= v < 20fps : Q=2 | : S=5 |
| | 20fps <= v < 25fps : Q=3 | : S=2 |
| | 25fps <= v : Q=4 | : S=1 |
| v = Web-page download time | Q(v) = A·v + B<br>A = -0.2<br>B = 4<br>Interval [0:20] | S(v) = C·v² + D<br>C = 0.0725<br>D = 1 |
| ... | ... | ... |

METHOD AND SCORE MANAGEMENT NODE FOR SUPPORTING SERVICE EVALUATION

TECHNICAL FIELD

The present disclosure relates generally to a method and a score management node for supporting service evaluation by obtaining a perception score P reflecting a user's experience of a service delivered by means of a telecommunication network.

BACKGROUND

When a service has been delivered by means of a telecommunication network by a service provider to one or more users, it is of interest for the service provider to know whether the user is satisfied with the delivered service or not, e.g. to find out if the service has shortcomings that need to be improved in some way to make it more attractive to this user and to other users. Service providers, e.g. network operators, are naturally interested in making their services as attractive as possible to users in order to increase sales, and a service may therefore be designed and developed so as to meet the users' demands and expectations as far as possible. It is therefore useful to gain knowledge about the users' opinion after service delivery in order to evaluate the service. The services discussed in this disclosure may, without limitation, be related to streaming of audio and visual content e.g. music and video, on-line games, web browsing, file downloads, voice and video calls, delivery of information e.g. in the form of files, images and notifications, and so forth, i.e. any service that can be delivered by means of a telecommunication network.

A normal way to obtain the users' opinion about a delivered service is to explicitly ask the customer, after delivery, to answer certain questions about the service in a survey or the like. For example, the service provider may send out or otherwise present an inquiry form, questionnaire or opinion poll to the customer with various questions related to user satisfaction of the service and its delivery. If several users respond to such a poll or questionnaire, the results can be used for evaluating the service, e.g. for finding improvements to make, provided that the responses are honest and that a significant number of users have answered. An example of using survey results for estimating the opinion of users is the so-called Net Promoter Score, NPS, which is calculated from answers to user surveys to indicate the users' collected opinions expressed in the survey answers.

However, it is often difficult to motivate a user to take the time and trouble to actually answer the questions and send a response back to the service provider. Users are often notoriously reluctant to provide their opinions on such matters, particularly in view of the vast amounts of information and questionnaires flooding users in the current modern society. One way to motivate the user is to reward him/her in some way when submitting a response, e.g. by giving some present or a discount either on the purchased services or when buying future services, and so forth.

Even so, it is a problem that surveys can in practice only be conducted for a limited number of users which may not be representative for all users of a service, and that the feedback cannot be obtained in "real-time", that is immediately after service delivery. A survey should not be sent to a user too frequently either. The obtained feedback may thus get out-of-date.

Further problems include that considerable efforts must be spent to distribute a survey to a significant but still limited number of users and to review and evaluate all answers coming in, sometimes with poor results due to low responsiveness. Furthermore, the user may provide opinions which are not really accurate or honest and responses to surveys may even be misleading. For example, the user is often prone to forget how the service was actually perceived or experienced when it was delivered, even after a short while, once prompted to respond to a questionnaire. Human memory thus tends to change over time, and the response given may not necessarily reflect what the user really felt and thought at service delivery. The user may further provide the response very hastily and as simply as possible not caring much if it really reflects their true opinion. The opinion expressed may also be dependent on the user's current mood such that different opinions may be expressed at different occasions, making the response all the more erratic and unreliable.

Still another problem is that it can be quite difficult to trace an underlying reason why users have been dissatisfied with a particular service, so as to take actions to eliminate the fault and improve the service and/or the network used for its delivery. Tracing the reason for such dissatisfaction may require that any negative opinions given by users need to be correlated with certain operational specifics related to network performance, e.g. relating to where, when and how the service was delivered to these users. This kind of information is not generally available and analysis of the network performance must be done manually by looking into usage history and history of network issues. Much efforts and costs are thus required to enable tracing of such faults and shortcomings.

SUMMARY

It is an object of embodiments described herein to address at least some of the problems and issues outlined above. It is possible to achieve this object and others by using a method and a score management node as defined in the attached independent claims.

According to one aspect, a method is performed by a score management node for supporting service evaluation by obtaining a perception score P reflecting a user's experience of a service delivered by means of a telecommunication network. In this method, the score management node receives network measurements related to service events when the service is delivered to the user. The score management node determines, for each received network measurement, a quality score Q reflecting the user's perception of quality of service delivery by applying a first function on said network measurement, and determines, for each received network measurement, an associated significance S reflecting the user's perception of importance of service delivery by applying a second function on said network measurement. The first and second functions are dependent on network measurement type. The score management node further calculates the perception score P based on the determined quality scores Q and associated significances S, wherein the calculated perception score P is made available for use in the service evaluation.

According to another aspect, a score management node is arranged to support service evaluation by obtaining a perception score P reflecting a user's experience of a service delivered by means of a telecommunication network. The score management node comprises a processor and a memory containing instructions executable by the processor, whereby the score management node is configured to:

receive network measurements related to service events when the service is delivered to the user, determine, for each received network measurement, a quality score Q reflecting the user's perception of quality of service delivery, by applying a first function on said network measurement, determine, for each received network measurement, an associated significance S reflecting the user's perception of importance of service delivery, by applying a second function on said network measurement, wherein the first and second functions are dependent on network measurement type, and calculate the perception score P based on the determined quality scores Q and associated significances S, wherein the calculated perception score P is made available for use in the service evaluation.

The above method and score management node may be configured and implemented according to different optional embodiments to accomplish further features and benefits, to be described below.

Thereby, the perception score P can be used in the service evaluation as an estimation of the users' opinion particularly since P is adapted to the type of network measurement used, and it is possible to obtain P automatically after every time a service is delivered to the user. Further, the perception score P is calculated from technical measurements in the network related to the service usage which are readily available for any user and it is thus not necessary to depend on the user to answer a survey or the like.

A computer program storage product is also provided comprising instructions which, when executed on at least one processor in the score management node, cause the at least one processor to carry out the method described above for the score management node.

BRIEF DESCRIPTION OF DRAWINGS

The solution will now be described in more detail by means of exemplary embodiments and with reference to the accompanying drawings, in which.

DETAILED DESCRIPTION

The embodiments described in this disclosure can be used for supporting evaluation of a service by obtaining an estimated user opinion about the service when it has been delivered to a user by means of a telecommunication network. The embodiments will be described in terms of functionality in a "score management node". Although the term score management node is used here, it could be substituted by the term "score management system" throughout this disclosure.

Briefly described, a perception score P is calculated that reflects the user's experience of the service, by using technical network measurements made for service events, i.e. occasions when the service was delivered to the user, which measurements are received by the score management node. For example, the network measurements may relate to the time needed to download data, the time from service request until delivery, call drop rate, data rate and data error rate.

In the following description, any network measurements related to delivery of a service to the user by means of a telecommunication network are generally denoted "v" regardless of measurement type and measuring method. It is assumed that such network measurements v are available in the network, e.g. as provided from various sensors, probes and counters at different nodes in the network, which sensors, probes and counters are commonly used for other purposes in telecommunication networks of today, thus being operative to provide the network measurements v used by the score management node in this solution. Key Performance Indicator, KPI, is a term often used in this field for parameters that in some way indicate network performance.

Further, the term "delivery of a service by means of a telecommunication network" may be interpreted broadly in the sense that it may also refer to any service delivery that can be recorded in the network by measurements that somehow reflect the user's experience of the service delivery. Some further examples include services provided by operator personal aided by an Operation and Support System, OSS, infrastructure. For example, "Point of sales" staff may be aided by various software tools for taking and executing orders from users. These tools may also be able to measure KPIs related to performance of the services. Another example is the Customer Care personal in call centers who are aided by some technical system that registers various user activities. Such technical systems may as well make network measurements related to these activities as input to the score management node.

For example, the network measurements v may be sent regularly from the network to the score management node, e.g. in a message using the hyper-text transfer protocol http or the file transfer protocol ftp over an IP (Internet Protocol) network. Otherwise the score management node may fetch the measurements v from a measurement storage where the network stores the measurements. In this disclosure, the term "network measurement v" may also refer to a KPI which is commonly prepared by the network to reflect actual physical measurements. The concept of KPIs is well-known as such in telecommunication networks.

The perception score P is calculated by the score management node as follows and with reference to FIG. 1 which illustrates a score management node 100 which receives network measurements v made in a telecommunication network 102 as related to service events when the service is delivered to the user. The network measurements v may be sent from the network 102 more or less in real-time in a "live stream" fashion, e.g. from an Operation & Maintenance, O&M, node or similar, not shown. Alternatively, the network measurements v may be recorded by the network and stored in a suitable storage or database 104, as indicated by a dashed one-way arrow, which information can be accessed by the score management node 100, e.g. at regular intervals, as indicated by a dashed two-way arrow.

The received network measurements v can be seen as "raw data" being used as input in this procedure. For example, the above O&M node may be an aggregation point or node for distributed sensors and probes that make measurements in the traffic flows throughout the network. This node may combine, correlate and potentially filter the measurement data, e.g. to produce KPIs or the like.

A quality score Q reflecting the user's perception of quality of a delivered service, is determined by applying a first function Q(v) on the network measurements v. Further, an associated significance S reflecting the user's perception of importance of the delivered service, is also determined by applying a second function S(v) on the network measurements v. In the example of FIG. 1, the quality score Q and its associated significance S are determined in this manner for each network measurement by a basic scoring module 100a in the score management node 100. The above-mentioned first and second functions Q(v), S(v) are predefined for a particular measurement type and they are maintained in the score management node 100, as indicated by numeral 100b, which the basic scoring module 100a is able to access. Different variants of the first and second functions Q(v), S(v) are thus maintained 100b for different measurement types which will be described in more detail later below, particularly with reference to FIGS. 3, 4a and 4b.

The perception score P of the received network measurements v is then derived from the quality scores Q which are weighted by their associated significances S. Basically, the greater significance S the greater influence has the associated quality score Q on the resulting perception score P. This disclosure is directed to describe how the above quality score Q, significance S and perception score P can be determined, among other things, according to some illustrative but non-limiting examples and embodiments.

Before calculating the perception score P, one or both of the quality score Q and associated significance S may be modified in this procedure depending on whether the quality score Q determined for a new service delivery event deviates significantly from a "normal", i.e. expected, level of the perception score P calculated previously. For example, the user may be assumed to expect basically the same level of quality "as usual" whenever a service is delivered. If the quality, as determined from one or more network measurements of a new service delivery event, suddenly departs from the expected level, the user can further be assumed to be "surprised" by the unexpected quality level and e.g. the significance S of that event may therefore be increased.

Figure 1:
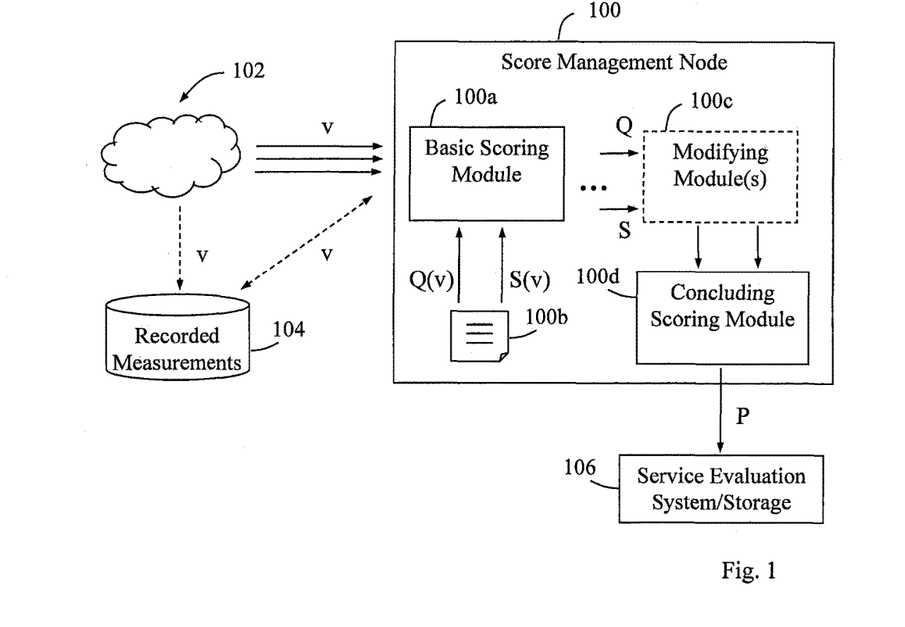
FIG. 1 is a block diagram illustrating an example of how a score management node may be configured and operate, according to some possible embodiments.

In FIG. 1 the score management node 100 may further comprise one or more modifying modules 100c which operate to modify the quality score Q and its associated significance S in order to compensate for various circumstances at the respective service delivery, e.g. including the user's expectations of the service delivery as mentioned above. The user's expectations are basically indicated by a previously determined overall perception score valid for one or more previous service deliveries. The modifying modules 100c may alternatively be termed intermediate scoring modules. For example, a modifying module 100c may modify one or both of the quality score Q and the associated significance S assuming that Q and/or S of a new service event may be impacted depending on a deviation between the new quality score Q and a previous perception score P, which deviation effectively reflects a degree of assumed "surprise" to the user. This operation will also be described in more detail later below, particularly with reference to FIGS. 6 and 7.

The perception score P is in this example calculated by a concluding scoring module 100d in the score management node 100. Having generated the resulting perception score P, the score management node 100 makes P available for evaluation of the service, e.g. by saving it in a suitable storage or sending it to a service evaluation system or center, schematically indicated by numeral 106. For example, P may be sent to the service evaluation system or storage 106 in an http message or an ftp message over an IP network. The service evaluation system or storage may comprise an SQL (Structured Query Language) database or any other suitable type of database. By using this solution, the perception score P can be seen as a model for how the user is expected to perceive the service given the circumstances of the delivered service, which model is based on objective network measurements. Thus, P is a quantification of the user's assumed perception of the service deliveries.

There are several advantages of this solution as compared to conventional ways of obtaining a user's opinion about a service. First, the perception score P is a quite accurate estimation of the users' opinion of the service event considering the prevailing circumstances, and it is possible to obtain P automatically and continuously in real-time, basically after every time a service is delivered to a user. There are thus no restrictions regarding the number of users nor the extension of time which makes it possible to obtain a quite representative perception score P. Second, the perception score P is calculated from technical measurements in the network related to the service usage which are true and "objective" as such, also being readily available, thereby avoiding any dependency on the user's memory and willingness to answer a survey or the like. Third, it is not necessary to spend time and efforts to distribute surveys and to collect and evaluate responses, which may require at least a certain amount of manual work.

Fourth, it is possible to gain further knowledge about the service by determining the perception score P selectively, e.g. for specific types of services, specific types of network measurements, specific users or categories of users, and so forth. Fifth, it is also possible to trace a technical issue that may have caused a "bad" experience of a delivered service by identifying which measurement(s) have generated a low perception score P. It can thus be determined when and how a service was delivered to a presumably dissatisfied user, as indicated by the perception score P, and therefore a likely technical shortcoming that has caused the user's dissatisfaction can also be more easily identified. Once found, the technical issue can be eliminated or repaired. Different needs for improvement of services can also be prioritized based on the knowledge obtained by the perception score P. Further features and advantages will be evident in the description of embodiments that follows.

In FIG. 1, the score management node 100 is illustrated as comprising various scoring modules 100a, 100c and 100d which may be a suitable configuration for enabling the embodiments described herein. Each scoring module may be a piece of software executed by a suitable execution platform. This includes the possibility to have all scoring modules compiled into one program. In this example, the scoring modules may be software modules, e.g. in the form of Java classes, that are compiled together into a single piece of software that contains the entire score calculation as exemplified above. A scoring coordinator may be used for controlling the operation of each scoring mode.

Alternatively, a potentially more flexible implementation may be used where the scoring modules are treated as separate services implemented by distinct pieces of software. They could for example be Service-Oriented Architecture, SOA, Web Services. It would also possible to have the scoring modules implemented as "worker nodes" in a stream processing environment such as "Storm". In general, each scoring module is a logical scoring node that can be realized in software and can be either co-deployed on one physical node or separated and deployed into a set of physical processing nodes.

Figure 2:
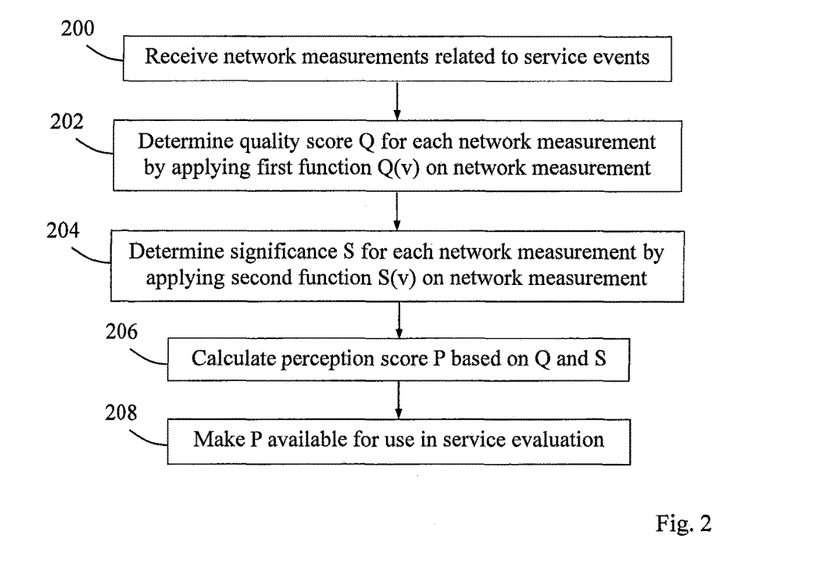
FIG. 2 is a flow chart illustrating a procedure in a score management node, according to further possible embodiments.

An example of how the solution may be employed will now be described with reference to the flow chart in FIG. 2 which illustrates a procedure with actions performed by a score management node, to accomplish the functionality described above. In this procedure the score management node operates to support service evaluation by obtaining a perception score P reflecting a user's experience of a service delivered by means of a telecommunication network, e.g. in the manner described above for the score management node 100.

A first action 200 illustrates that the score management node receives network measurements related to service events when the service is delivered to the user. This operation may be performed in different ways, e.g. when the network sends a stream of network measurements to the score management node as they are generated. The score management node may also fetch network measurements from a storage of recorded measurements, e.g. the storage 104 of FIG. 1, as described above. Action 200 may thus be executed continuously or regularly any time during the course of this process and the following actions. The protocol used in this communication may be the hyper-text transfer protocol http or the file transfer protocol ftp, and the network measurements may be received in a message such as a regular http message or ftp message. In some possible embodiments, the score management node may thus receive the network measurements in a message according to the hyper-text transfer protocol http or the file transfer protocol ftp.

In a next action 202, the score management node determines, for each received network measurement, a quality score Q reflecting the user's perception of quality of the delivered service, by applying a first function Q(v) on the respective received network measurement v. In a further action 204, the score management node determines, for each received network measurement, an associated significance S reflecting the user's perception of importance of the delivered service by applying a second function S(v) on the respective received network measurement v. The first and second functions Q(v) and S(v) are thus predefined and available for the score management node. Furthermore, the first and second functions Q(v) and S(v) are dependent on network measurement type which will be explained and exemplified later below.

In some possible but non-limiting embodiments, the network measurement type may be related to any of: data rate, the time from service request until delivery, the time needed to download data, call drop rate, and data error rate. These are only examples of network measurement types and the solution may use any type of network measurements and KPIs that are somehow indicative of the user's experience of the service events. Further illustrative examples include the number of times a user is calling customer support which can be taken as a sign of dissatisfaction, or the time until an order or the like is delivered by means of the telecommunication network.

Different variants of the first and second functions may thus have been predefined for different network measurement types, e.g. being maintained in the score management node as indicated by the numeral 100b in FIG. 1. For example, a variant of function Q(v) or S(v) applied on, say, a measurement of data rate is different from a variant of function Q(v) or S(v) applied on a measurement of call drop rate, to mention a non-limiting but illustrative example.

In another possible embodiment, the score management node may maintain associations between different network measurement types and different variants of the first and second functions, e.g. in a suitable document or data storage as indicated by 100b in FIG. 1. In this embodiment, the score management node may select a variant of the first and second functions according to said associations for determining the quality score Q and associated significance S for each network measurement. When receiving a network measurement, the score management node is thus able to identify the type of the network measurement and select a variant of the first and second functions according to the identified measurement type. In further possible embodiments, each of the first and second functions may be a discrete function or a continuous function, which will be exemplified and described in more detail later below with reference to FIGS. 4a and 4b.

In a following action 206, the score management node calculates the perception score P based on the determined quality scores Q and associated significances S. The score management node then makes the calculated perception score P available for use in the service evaluation, as indicated by a last action 208, e.g. by sending P to a suitable service evaluation system or storage, e.g. as indicated by numeral 106 in FIG. 1. The protocol used in this communication may be e.g. the hyper-text transfer protocol http or the file transfer protocol ftp, and the perception score P may be sent to the service evaluation system or storage in an http message or an ftp message over an IP network. The service evaluation system or storage may comprise an SQL (Structured Query Language) database or any other suitable type of database.

The perception score P calculated in action 206 may be obtained in different ways. In a possible embodiment, the score management node may determine multiple pairs of the quality score Q and associated significance S based on the network measurements, e.g. one pair for each network measurement. A pair of Q and S is thus determined for each service event based on the network measurement for that service event. The score management node may then calculate the perception score P as an average of the quality scores Q weighted by their associated significances S in all the above pairs of Q and S. In a further possible embodiment, this may be done such that when the number of service events is N, the score management node calculates the perception score $P_N$ for the N events of service delivery to the user as $$\mu_N = \frac{\sum_{n=1}^{N} Q_n S_n}{\sum_{n=1}^{N} S_n}$$

where $Q_n$ is the quality score determined for each service event n and $S_n$ is the associated significance determined for said service event n. In other words, the sum of all N quality scores weighted by their significances is divided by the sum of all the N significances. Thereby, the quality score $Q_n$ for each service event n will impact the overall perception score $P_N$ according to its associated significance $S_n$ and $P_N$ will thus become an accurate representation of the user's perception of quality of service delivery across all service events N. These embodiments may have the advantage that a perception score can be obtained that reflects the user's experience of a service over a specific selection of service events N. The overall perception score $P_N$ may thus be calculated for any selection of service events N as desired.

Alternatively, an "accumulated" perception score P may be obtained and updated after each new service event as follows. Thus in another possible embodiment, the score management node may update the perception score P after a new service event n based on a previous perception score $P_{n-1}$ calculated for a previous time interval or service event and a quality score $Q_n$ and associated significance $S_n$ determined for the new service event n, as $$P_n = \frac{P_{n-1}S_{sum,n-1} + Q_n S_n}{S_{sum,n-1} + S_n}$$

where $$S_{sum,n} = \sum_{n=1}^{N} g_n$$

and $P_n$ is the updated perception score. In this way, the perception score P can be kept up-to-date after each new service event by using the above simple calculation which adds the influence of the new service event n on the total P. This embodiment may have the advantage that the updated perception score $P_n$ reflects the user's experience of a service in a "continuous" manner by always taking the latest service event into account.

In yet another possible embodiment, the score management node may determine the perception score P for a service of a particular type by calculating the perception score P according to the above procedure for multiple users upon service delivery to the users with a service of said particular type. The additional information provided by this embodiment may be used to support or facilitate tracing of any technical issue that may cause a low perception score P for the particular service type.

Figure 3:
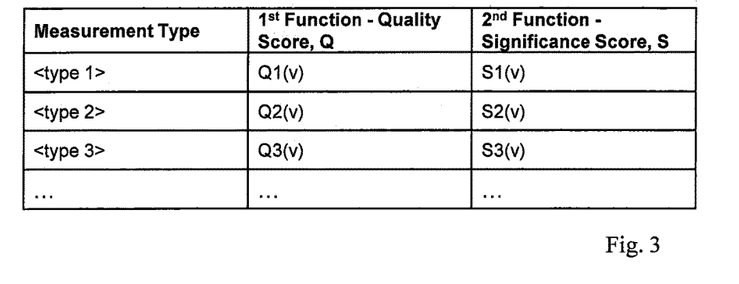
FIG. 3 is a table illustrating different functions that a score management node may use for different measurement types, according to further possible embodiments.

It was mentioned above that different variants of the first and second functions Q(v), S(v) may have been predefined for different network measurement types, and that the score management node may maintain associations between the respective network measurement types and the variants of the functions, e.g. as indicated by numeral 100b in FIG. 1. FIG. 3 is a table illustrating an example of how such variants of the functions may be associated with network measurement types where a variant Q1(v) of the first function and a variant S1(v) of the second function are associated with a measurement "type 1". Further, another variant Q2(v) of the first function and another variant S2(v) of the second function are associated with another measurement "type 2", and so forth. By identifying the measurement type of an incoming network measurement, the score management node can thus find the correct variants of the first and second functions Q(v), S(v) in this table and apply them accordingly to determine Q and S.

Figure 4A:
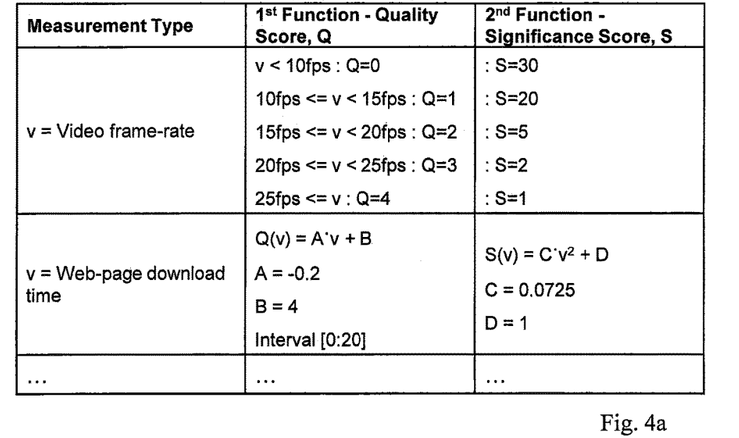
FIG. 4a is another table illustrating some examples of discrete and continuous functions that a score management node may use for different measurement types, according to further possible embodiments.
Figure 4B:
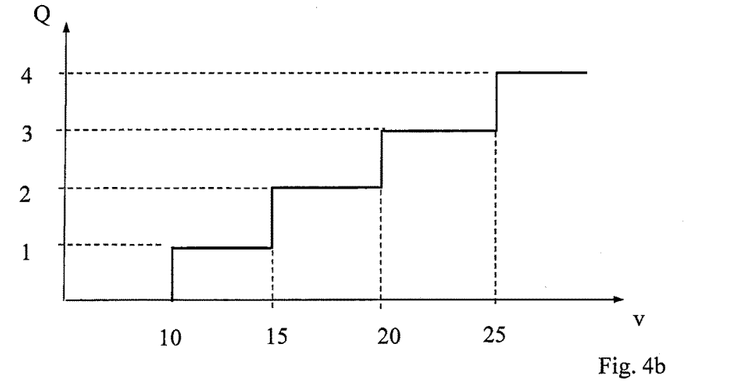
FIG. 4b is a diagram illustrating how a quality score Q can be determined using a discrete function shown in FIG. 4a, according to further possible embodiments.

FIG. 4a is another table comprising some non-limiting but illustrative examples of variants of the functions Q(v) and S(v) for two network measurement types, video-frame rate and the time needed to download a web page. It was further mentioned above that either of the first and second functions may be a discrete function or a continuous function. In FIG. 4a, each of the first function Q(v) and the second function S(v) is a discrete function for the measurement type video-frame rate, such that Q increases and S decreases in discrete steps upon increased video-frame rate v. FIG. 4b illustrates how Q increases in discrete steps upon increased video-frame rate v in frames per second, fps, according to FIG. 4a. In more detail, Q=0 when v is lower than 10, Q=1 when v is between 10 and 15, Q=2 when v is between 15 and 20, Q=3 when v is between 20 and 25, and Q=4 when v is higher than 25. On the other hand, each of the first function Q(v) and the second function S(v) is a continuous function for the measurement type time needed to download a web page, meaning that Q decreases and S increases continuously upon increased time needed to download a web page.

It should be noted that the functions Q(v) and S(v) for the measurement type video-frame rate produce higher Q and lower S values the higher the video-frame rate is, while the functions Q(v) and S(v) for the measurement type video-frame rate produce lower Q and higher S values the longer time needed to download a web page. By these variants of functions Q(v) and S(v), it is assumed that Q is relatively low and S is relatively high when the network measurement v indicates "bad" quality, either by low video-frame rate or by higher the time needed to download a web page, and vice versa.

Figure 5:
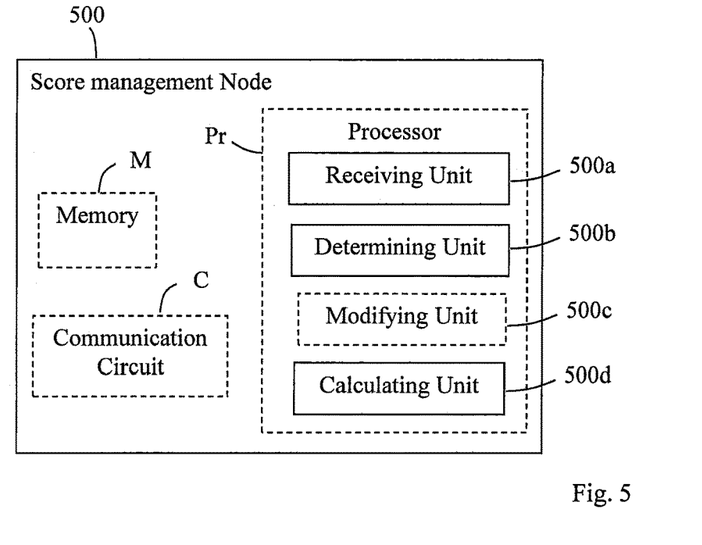
FIG. 5 is a block diagram illustrating an example of how a score management node may be configured, according to further possible embodiments.

The block diagram in FIG. 5 illustrates another detailed but non-limiting example of how a score management node 500 may be structured to bring about the above-described solution and embodiments thereof. In this figure, the score management node 500 may thus be configured to operate according to any of the examples and embodiments of employing the solution as described above, where appropriate, and as follows. The score management node 500 in this example is shown in a configuration that comprises a processor "Pr", a memory "M" and a communication circuit "C" with suitable equipment for receiving and transmitting data and messages in the manner described herein.

The communication circuit C in the score management node 500 thus comprises equipment configured for communication with a telecommunication network, not shown, using one or more suitable communication protocols depending on implementation. As in the examples discussed above, the score management node 500 is configured or arranged to perform e.g. the actions of the flow chart illustrated in FIG. 2 in the manner described above. These actions may be performed by means of functional units in the processor Pr in the score management node 500 as follows.

The score management node 500 is arranged to support service evaluation based on a perception score P reflecting a user's experience of a service delivered by means of a telecommunication network. The score management node 500 thus comprises the processor Pr and the memory M, said memory comprising instructions executable by said processor, whereby the score management node 500 is operable as follows.

The score management node 500 is configured to receive network measurements related to at least one service event when the service is delivered to the user. This receiving operation may be performed by a receiving unit 500a in the score management node 500, e.g. in the manner described for action 200 above. The score management node 500 is also configured to determine, for each received network measurement v, a quality score Q reflecting the user's perception of quality of the delivered service, by applying a first function Q(v) on said network measurement v. This determining operation may be performed by a determining unit 500b in the score management node 500, e.g. in the manner described for action 202 above. The score management node 500 is also configured to determine, for each received network measurement v, an associated significance S reflecting the user's perception of importance of the delivered service, by applying a second function S(v) on said network measurement v. This determining operation may be performed by the determining unit 500b, e.g. in the manner described for action 204 above. Furthermore, the first and second functions Q(v) and S(v) are dependent on network measurement type, which has been described above with reference to FIGS. 3, 4a, 4b.

The score management node 500 is further configured to calculate the perception score P based on the determined quality scores Q and associated significances S. This calculating operation may be performed by a calculating unit 500d in the score management node 500, e.g. in the manner described for action 206 above. The score management node 500 is also configured to make the calculated perception score P available for use in the service evaluation, e.g. in the manner described for action 208 above.

It should be noted that FIG. 5 illustrates some possible functional units in the score management node 500 and the skilled person is able to implement these functional units in practice using suitable software and hardware. Thus, the solution is generally not limited to the shown structure of the score management node 500, and the functional units 500a-d may be configured to operate according to any of the features described in this disclosure, where appropriate.

The embodiments and features described herein may thus be implemented in a computer program storage product comprising instructions which, when executed on at least one processor, cause the at least one processor to carry out the above actions e.g. as described for any of FIGS. 1-7. Some examples of how the computer program and the carrier can be realized in practice are outlined below, and with further reference to FIG. 5.

The processor Pr may comprise a single Central Processing Unit (CPU), or could comprise two or more processing units. For example, the processor Pr may include a general purpose microprocessor, an instruction set processor and/or related chips sets and/or a special purpose microprocessor such as an Application Specific Integrated Circuit (ASIC). The processor Pr may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the score management node 500.

It was mentioned above that before the perception score P is calculated, one or both of the quality score Q and the associated significance S of a service event may be modified to compensate for the user's expectations of the service delivery in consideration of the perception score obtained for one or more previous service deliveries. This may be done by considering a deviation, i.e. difference, between the quality score Q of a new service event and a previously determined overall perception score P. In the following examples and embodiments, the term "partial parameter pp" is used for short to represent any of the quality score Q and the associated significance S of a service event.

In a possible embodiment, the score management node may modify a partial parameter pp being one of a new quality score $Q_{new}$ and associated new significance $S_{new}$ determined for a latest network measurement, based on a deviation D between the new quality score $Q_{new}$ and a previously calculated and obtained overall perception score $P_{overall}$ where $D=P_{overall}-Q_{new}$. Then, the score management node is able to calculate a new perception score $P_{new}$ using the modified partial parameter $pp_{mod}$, e.g. in accordance with any of the embodiments described above where appropriate. The overall perception score $P_{overall}$ has thus been determined according to any of the above-described procedures and embodiments for service events when the service has been delivered to the user prior to a "new" service event that has generated the above-mentioned latest network measurement.

This modifying operation may be performed by one of the modifying module(s) 100b illustrated in FIG. 1, which has also been described above. The score management node 100 in FIG. 1 can be seen as a "pipeline" for processing data in a succession of modules staring with the basic scoring module 100a that determines Q and S from each of the received network measurements. Q and S may then be modified in the following one or more modifying modules 100b. The processing is finally completed by the concluding scoring module that calculates P from the possibly modified Q and S. One of the modifying modules 100b may thus modify Q and/or S depending on the above deviation D. There may be one or more further modifying modules arranged before or after the one that modifies Q and/or S according to the latter embodiment.

The above-described deviation D between the new quality score $Q_{new}$ and the previously calculated overall perception score $P_{overall}$ can thus be seen as a measure of surprise when the user experiences the new service event which may impact either of $Q_{new}$ and $S_{new}$, referred to as the partial parameter pp. In another possible embodiment, the score management node may modify the partial parameter pp if the deviation D between the new quality score $Q_{new}$ and the overall perception score $P_{overall}$ exceeds a predefined threshold. If the deviation D does not exceed the threshold, it can be assumed that the user has not experienced the new service event as notably different from what is expected. For example, if the deviation D does exceed the threshold when the new quality score $Q_{new}$ is significantly lower than the overall perception score $P_{overall}$, the significance $S_{new}$ of that service event may be increased assuming that the user is more inclined to notice and remember a "bad" experience more compared to a "normal" experience.

The partial parameter pp may be modified depending on the deviation D as follows. The score management node may, in another possible embodiment, determine a modifying factor F based on the deviation D and may then modify the partial parameter pp by applying the modifying factor F on the partial parameter pp to obtain the modified partial parameter as $pp_{mod}=F \cdot pp$ The modifying factor F may be determined according to a predefined function of the deviation D e.g. as shown in FIG. 6.

Figure 6:
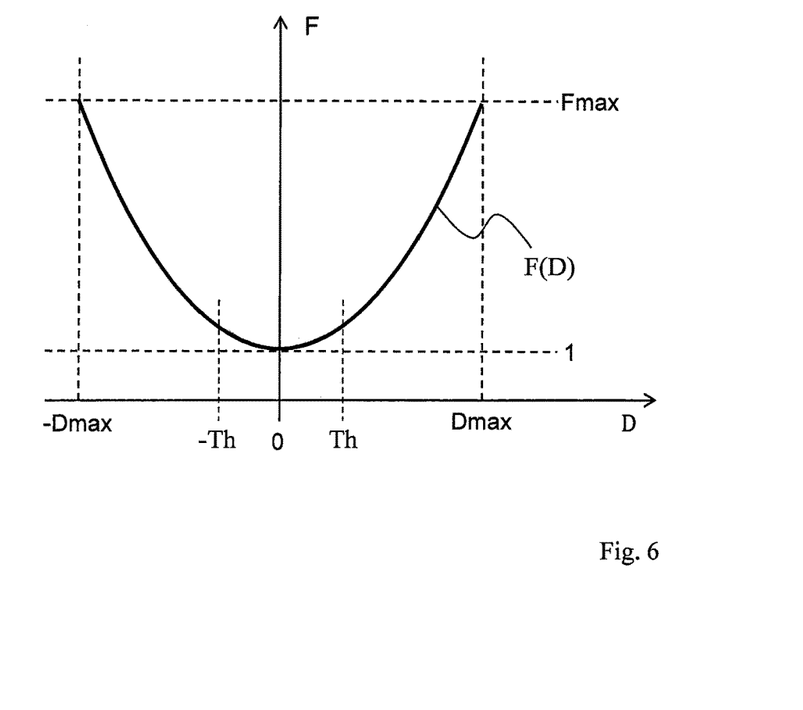
FIG. 6 is a diagram illustrating how a modifying factor F may be determined based on a deviation D between a new quality score and a previously determined overall perception score, according to further possible embodiments.

FIG. 6 thus illustrates an example of a predefined function of the deviation D and how the modifying factor F may be determined according to this function F(D). The deviation D can vary between a maximum value Dmax on either side of D=0. According to function F(D), the modifying factor F has a minimum value of F=1 when D=0, i.e. the partial parameter pp is not changed at all when there is no deviation between $Q_{new}$ and $P_{overall}$. The modifying factor F is greater than 1 on either side of D=0. Thus, in another possible embodiment, the partial parameter pp may be increased when the size of the deviation D increases, e.g. as indicated by the function F(D) in FIG. 6. A threshold Th is also indicated in FIG. 6 on either side of D=0, which may be used for determining whether it is motivated to modify the partial parameter or not, as described above.

Figure 7:
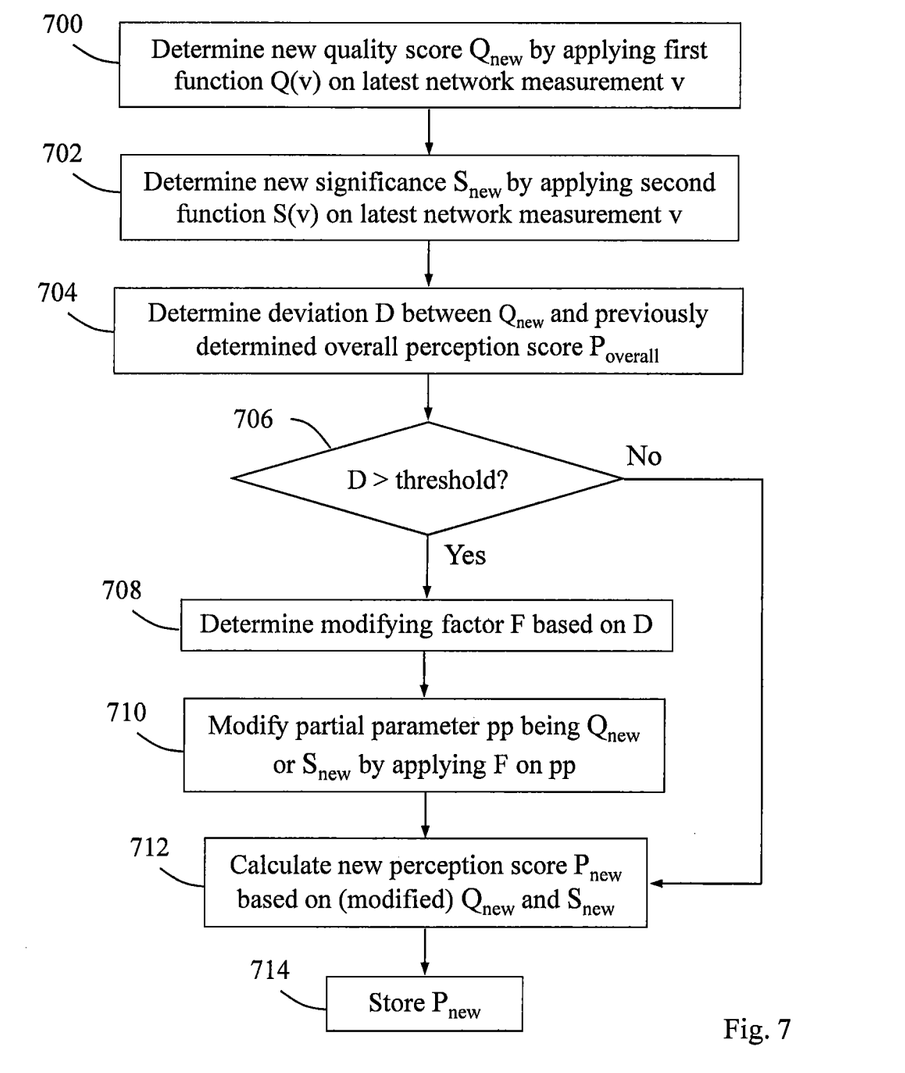
FIG. 7 is a flow chart illustrating an example of a more detailed procedure in a score management node, according to further possible embodiments.

A more detailed example of how a score management node may operate by employing some of the above-described embodiments, will now be described with reference to the flow chart in FIG. 7. In this example, the score management node is configured to modify the partial parameter pp when the deviation D between $Q_{new}$ and $P_{overall}$ exceeds the above-mentioned predefined threshold Th. It is also assumed that the overall perception score $P_{overall}$ has been determined for one or more previous service events that have occurred prior to a new service event for which the score management node has received a latest network measurement v.

In a first action 700, the score management node determines Q by applying a first function Q(v) on the received network measurement v. In another action 702, the score management node determines S by applying a second function S(v) on the respective received network measurement v. Actions 700 and 702 may be performed in the manner described for actions 202 and 204, respectively.

A following action 704 illustrates that the score management node determines a deviation D between $Q_{new}$ and $P_{overall}$ according to $D=P_{overall}-Q_{new}$. The score management node then checks in an action 706 whether the deviation D exceeds the predefined threshold Th which would imply that the user's experience of the new service event as indicated by $Q_{new}$ is notably, or surprisingly, different from what has been experienced earlier as indicated by $P_{overall}$. If so, the score management node proceeds to determine, in an action 708, the above-described modifying factor F according to a predefined function of the deviation D, which has been exemplified in FIG. 6.

In a further action 710, the score management node modifies the partial parameter pp being one of the new quality score $Q_{new}$ and its associated new significance $S_{new}$ determined in actions 700 and 702, respectively. The score management node thus modifies by applying F on pp so that the modified partial parameter $pp_{mod}=F \cdot pp$. If the deviation D does not exceed the predefined threshold Th in action 706, actions 708 and 710 are omitted and none of $Q_{new}$ and $S_{new}$ is modified.

A following action 712 illustrates that the score management node calculates a new perception score $P_{new}$ based on $Q_{new}$ and $S_{new}$, either of which may have been modified by the modifying factor F as of actions 708, 710 depending on the outcome of action 706. The score management node finally makes the calculated perception score $P_{new}$ available for use in the service evaluation, as indicated by a last action 714, in this case by storing $P_{new}$ in a suitable storage that a service evaluation system or the like can access.

While the solution has been described with reference to specific exemplifying embodiments, the description is generally only intended to illustrate the inventive concept and should not be taken as limiting the scope of the solution. For example, the terms "score management node", "service event", "scoring module", "perception score", "quality score", "significance", "network measurement", "network measurement type", "partial parameter" and "modifying factor" have been used throughout this disclosure, although any other corresponding entities, functions, and/or parameters could also be used having the features and characteristics described here. The solution is defined by the appended claims.

The invention claimed is:

1. A method performed by a score management node for supporting service evaluation by obtaining a perception score P reflecting a user's experience of a service delivered by means of a telecommunication network, the score management node comprising a processor and a memory comprising instructions executable by the processor, wherein the instructions, when executed by the processor, causes the processor to perform the steps of the method, the method comprising:

receiving network measurements related to service events when the service is delivered to the user, determining, for each received network measurement, a quality score Q reflecting the user's perception of quality of service delivery, by applying a first function on said network measurement, determining, for each received network measurement, an associated significance S reflecting the user's perception of importance of service delivery, by applying a second function on said network measurement, wherein the first and second functions are dependent on a network measurement type, calculating the perception score P based on the determined quality scores Q and associated significances S, and transmitting, to a service evaluation system, the calculated perception score, wherein the calculated perception score is used by the service evaluation system in the service evaluation to prioritize services based on the perception score P, wherein the score management node modifies a partial parameter pp being one of a new quality score $Q_{new}$ and associated new significance $S_{new}$ determined for a latest network measurement, based on a deviation D between the new quality score $Q_{new}$ and a previously calculated and obtained overall perception score $P_{overall}$ where $D=P_{overall}-Q_{new}$, and calculates a new perception score $P_{new}$ using the modified partial parameter $pp_{mod}$.

2. A method according to claim 1, wherein said network measurement type is related to any of:

data rate, the time from service request until delivery, the time needed to download data, call drop rate, and data error rate.

3. A method according to claim 1, wherein the score management node maintains associations between different network measurement types and different variants of the first and second functions, and selects a variant of the first and second functions according to said associations for determining the quality score Q and associated significance S for each network measurement.

4. A method according to claim 1, wherein each of the first and second functions is a discrete function or a continuous function.

5. A method according to claim 1, wherein the score management node determines multiple pairs of the quality score Q and associated significance S based on the network measurements, and calculates the perception score P as an average of the quality scores Q weighted by their associated significances S.

6. A method according to claim 5, wherein the score management node calculates the perception score $P_N$ for N events of service delivery to the user as $$P_N = \frac{\sum_{n=1}^{N} Q_n S_n}{\sum_{n=1}^{N} S_n}$$

where $Q_n$ is the quality score for each service event n and $S_n$ is the associated significance for said service event n.

7. A method according to claim 5, wherein the score management node updates the perception score P after a new service event n based on a previous perception score $P_{n-1}$ calculated for a previous time interval or service event and a quality score $Q_n$ and associated significance $S_n$ determined for the new service event n, as $$P_n = \frac{P_{n-1} S_{sum,n-1} + Q_n S_n}{S_{sum,n-1} + S_n}$$

where $$S_{sum,n} = \sum_{n=1}^{N} S_n$$

and $P_n$ is the updated perception score.

8. A method according to claim 1, wherein the score management node determines the perception score P for a service of a particular type by performing the method for multiple users upon service delivery to the users with a service of said particular type.

9. A method according to claim 1, wherein the score management node further modifies the partial parameter pp if the deviation D exceeds a predefined threshold.

10. A method according to claim 1, wherein the score management node determines a modifying factor F based on the deviation D and modifies the partial parameter pp by applying the modifying factor F on the partial parameter pp to obtain the modified partial parameter as $pp_{mod}=F \cdot pp$.

11. A method according to claim 1, wherein the partial parameter pp is increased when the size of the deviation D increases.

12. A method according to claim 1, wherein the score management node receives the network measurements in a message according to the hyper-text transfer protocol http or the file transfer protocol ftp.

13. A computer program storage product comprising instructions which, when executed on at least one processor, cause the at least one processor to carry out the method according to claim 1.

14. A score management node arranged to support service evaluation by obtaining a perception score P reflecting a user's experience of a service delivered by means of a telecommunication network, the score management node comprising a processor and a memory comprising instructions executable by the processor, whereby the score management node is configured to:
receive network measurements related to service events when the service is delivered to the user,
determine, for each received network measurement, a quality score Q reflecting the user's perception of quality of service delivery, by applying a first function on said network measurement,
determine, for each received network measurement, an associated significance S reflecting the user's perception of importance of service delivery, by applying a second function on said network measurement, wherein the first and second functions are dependent on network measurement type, and
calculate the perception score P based on the determined quality scores Q and associated significances S, wherein the calculated perception score P is made available for use in the service evaluation,
transmitting, to a service evaluation system, the calculated perception score, wherein the calculated perception score is used by the service evaluation system in the service evaluation to prioritize services based on the perception score P,
wherein the score management node modifies a partial parameter pp being one of a new quality score $Q_{new}$ and associated new significance $S_{new}$ determined for a latest network measurement, based on a deviation D between the new quality score $Q_{new}$ and a previously calculated and obtained overall perception score $P_{overall}$ where $D=P_{overall}-Q_{new}$, and calculates a new perception score $P_{new}$ using the modified partial parameter $pp_{mod}$.

15. A score management node according to claim 14, wherein said network measurement type is related to any of:
data rate,
the time from service request until delivery,
the time needed to download data,
call drop rate, and
data error rate.

16. A score management node according to claim 14, wherein the score management node is configured to maintain associations between different network measurement types and different variants of the first and second functions, and to select a variant of the first and second functions according to said associations for determining the quality score Q and associated significance S for each network measurement.

17. A score management node according to claim 14, wherein each of the first and second functions is a discrete function or a continuous function.

18. A score management node according to claim 14, wherein the score management node is configured to determine multiple pairs of the quality score Q and associated significance S based on the network measurements, and to calculate the perception score P as an average of the quality scores Q weighted by their associated significances S.

19. A score management node according to claim 18, wherein the score management node is configured to calculate the perception score $P_N$ for N events of service delivery to the user as $$P_N = \frac{\sum_{n=1}^{N} Q_n S_n}{\sum_{n=1}^{N} S_n}$$

where $Q_n$ is the quality score for each service event n and $S_n$ is the associated significance for said service event n.

20. A score management node according to claim 18, wherein the score management node is configured to update the perception score P after a new service event n based on a previous perception score $P_{n-1}$ calculated for a previous time interval or service event and a quality score $Q_n$ and associated significance $S_n$ determined for the new service event n, as $$P_n = \frac{P_{n-1}S_{sum,n-1} + Q_n S_n}{S_{sum,n-1} + S_n}$$

where $$S_{sum,n} = \sum_{n=1}^{N} S_n$$

and $P_n$ is the updated perception score.

21. A score management node according to claim 14, wherein the score management node is configured to determine the perception score P for a service of a particular type by calculating the perception score P for multiple users upon service delivery to the users with a service of said particular type.

22. A score management node according to claim 14, wherein the score management node is further configured to modify the partial parameter pp if the deviation D exceeds a predefined threshold.

23. A score management node according to claim 14, wherein the score management node is further configured to determine a modifying factor F based on the deviation D and to modify the partial parameter pp by applying the modifying factor F on the partial parameter pp to obtain the modified partial parameter as $pp_{mod}=F \cdot pp$.

24. A score management node according to claim 14, wherein the partial parameter pp is increased when the size of the deviation D increases.

25. A score management node according to claim 14, wherein the score management node is configured to receive the network measurements in a message according to the hyper-text transfer protocol http or the file transfer protocol ftp.

* * * * *